(12) United States Patent
Gaudreau et al.

(10) Patent No.: US 7,498,693 B2
(45) Date of Patent: *Mar. 3, 2009

(54) MORE COMPACT AND HIGHER RELIABILITY POWER SOURCE SYSTEM

(75) Inventors: Marcel Pierre Joseph Gaudreau, Lexington, MA (US); Peter Andrew Dandridge, Beverly, MA (US); Michael Alan Kempkes, Westford, MA (US); Jeffrey Allen Casey, Winchester, MA (US)

(73) Assignee: Diversified Technologies, Inc., Bedford, MA (US)

( * ) Notice: Subject to any disclaimer, the term of this patent is extended or adjusted under 35 U.S.C. 154(b) by 78 days.

This patent is subject to a terminal disclaimer.

(21) Appl. No.: 11/060,202

(22) Filed: Feb. 17, 2005

(65) Prior Publication Data

US 2005/0180181 A1    Aug. 18, 2005

Related U.S. Application Data

(60) Provisional application No. 60/545,444, filed on Feb. 18, 2004, provisional application No. 60/545,461, filed on Feb. 18, 2004.

(51) Int. Cl.
*H02J 1/00* (2006.01)
*H02J 3/00* (2006.01)

(52) U.S. Cl. ............................................. 307/82

(58) Field of Classification Search ................. 307/82, 307/43, 45, 58, 147; 363/65
See application file for complete search history.

(56) References Cited

U.S. PATENT DOCUMENTS

| | | | | |
|---|---|---|---|---|
| 4,635,178 A | * | 1/1987 | Greenhalgh | 363/65 |
| 5,073,848 A | * | 12/1991 | Steigerwald et al. | 363/65 |
| 5,513,094 A | * | 4/1996 | Stanley | 363/98 |
| 5,768,117 A | * | 6/1998 | Takahashi et al. | 363/65 |
| 5,883,797 A | * | 3/1999 | Amaro et al. | 363/65 |
| 5,894,413 A | * | 4/1999 | Ferguson | 363/65 |
| 6,076,142 A | * | 6/2000 | Corrington et al. | 711/114 |
| 6,268,716 B1 | * | 7/2001 | Burstein et al. | 323/272 |
| 6,894,466 B2 | * | 5/2005 | Huang et al. | 323/272 |
| 2001/0036089 A1 | * | 11/2001 | Gattavari et al. | 363/21.01 |

* cited by examiner

*Primary Examiner*—Stephen W Jackson
*Assistant Examiner*—Carlo Amaya
(74) *Attorney, Agent, or Firm*—Iandiorio Teska & Coleman

(57) ABSTRACT

This invention features a more compact and higher reliability power source system for computing loads, the system including a high voltage DC bus connected to a number of DC sources each connected to the high voltage DC bus by a switch configured to deliver to the high voltage DC bus the DC source with the highest DC voltage, a low voltage DC bus connected to the computing loads, and a power supply including a number of DC/DC converters connected in parallel between the high voltage DC bus and the low voltage DC bus, and a controller configured to modulate each DC/DC converter to convert the high voltage on the high voltage DC bus to a low voltage output on the low voltage DC bus.

35 Claims, 9 Drawing Sheets

MORE COMPACT AND HIGHER RELIABILITY POWER SOURCE SYSTEM

RELATED APPLICATIONS

This application claims priority of U.S. Provisional Application No. 60/545,444 filed Feb. 18, 2004 and U.S. Provisional Application Ser. No. 60/545,461 filed Feb. 18, 2004. All of these applications are incorporated by reference herein.

FIELD OF THE INVENTION

This invention relates to a compact, higher reliability power source system for supplying low voltage DC power to computing loads from a high voltage DC power source.

BACKGROUND OF THE INVENTION

In a typical installation of a telecommunications system, data communications system, computer equipment, servers, and the like, power is almost always supplied by a massive rechargeable storage battery system with sufficient capacity to carry the system through any power outages or interruptions. The battery system is completely clamped at the sum of individual cell voltages and any primary power interruptions are completely bridged. Hence, any powerline-frequency ripple coming from the external source is completely absorbed. The battery system can supply the equipment with the DC voltage and can completely isolate any equipment attached thereto from utility outages, ripple, and other problems with the external power source. Battery drain is kept small by a charging current that is continuously furnished from an external high voltage AC source, such as a utility main line or an uninterruptable power supply (UPS). The system chooses between the utility source or the UPS with a static transfer switch. The high voltage AC output from the static transfer switch is then input to a transformer/rectifier device that supplies the needed charging current. However, conventional static transfer switches and transformer/rectifier devices typically provide no redundancy capabilities. Hence, failure of one of the components of these devices requires shutting the device down to replace the damaged component. Because the battery system is no longer being charged, it can sustain the system only for a limited number of hours, after which failure of the battery supplied power will result.

Conventional battery systems typically distribute the DC power at voltages close to the final application voltages. Since losses are proportional to current squared times the resistance ($I^2R$), keeping $I^2R$ losses down has required conventional battery systems to employ expensive, bulky, and not readily reconfigurable, bus-bar current distribution systems to carry the high current, low voltage DC power close to the point of use.

In the past, the conventional battery based systems have been adequate. However, the recent explosion in demand for data communications and computer services makes the shortcomings of battery based systems clear. Prior battery based systems are expensive, massive, inflexible and occupy too much space. Moreover, the environmental hazards associated with the toxic waste created during battery manufacturing and disposal are increasingly intolerable.

To date, high voltage DC power distribution has been impractical because of the lack of an economical and scalable DC-DC voltage down-converter. Very large Ultra HVDC converters have been in use for many years, but they require gigantic installations and are completely unsuited to scaling down for the purpose of distributing DC power at common distribution voltages needed for a telecommunications system or a data communication system.

SUMMARY OF THE INVENTION

It is therefore an object of this invention to provide a more compact and higher reliability power source system for computing loads.

It is a further object of this invention to provide such a power source system that provides low voltage DC without the need for a large and expensive central battery system.

It is a further object of this invention to provide such a power source system which eliminates the need for a bulky, massive, inflexible and expensive bus-bar current distribution system.

It is a further object of this invention to provide such a power source system in the low voltage DC can be delivered close to the point of intended use.

It is a further object of this invention to provide such a power source system which provides redundancy capabilities to improve reliability.

It is a further object of this invention to provide such a power source system in which the primary components of the system can be removed, replaced, or added to the system while the system is running.

It is a further object of this invention to provide such a power source system in which the primary components are hot swappable.

It is a further object of this invention to provide such a power source system which improves the ratio of the distribution voltage to final application voltage.

It is a further object of this invention to provide such a power source system which is less expensive.

It is a further object of this invention to provide such a power source system which utilizes less space.

It is a further object of this invention to provide such a power source system which can easily be physically or electrically reconfigured.

It is a further object of this invention to provide such a power source system which eliminates the toxic environmental problems associated with utilizing a battery based system.

This invention results from the realization that a more compact and higher reliability power source system for providing low voltage DC voltage to computing loads can be effected by the unique combination of a high voltage DC bus that is connected to a number of DC sources that are each connected to the high voltage DC bus by a switch that delivers the DC source with the highest voltage to the high voltage DC bus, a low voltage DC bus connected to computing loads, and a power supply that includes a number of DC/DC converters connected in parallel between the high voltage DC bus and the low voltage DC bus that includes a controller for modulating each of the DC/DC converters to convert the high voltage on the high voltage DC bus to a low voltage DC output on the low voltage DC bus.

The subject invention, however, in other embodiments, need not achieve all these objectives and the claims hereof should not be limited to structures or methods capable of achieving these objectives.

This invention features a more compact and higher reliability power source system for computing loads, the system including a high voltage DC bus connected to a number of DC sources each connected to the high voltage DC bus by a switch configured to deliver to the high voltage DC bus the DC source with the highest DC voltage, a low voltage DC bus connected to the computing loads, and a power supply including a number of DC/DC converters connected in parallel between the high voltage DC bus and the low voltage DC bus, and a controller configured to modulate each DC/DC converter to convert the high voltage on the high voltage DC bus to a low voltage output on the low voltage DC bus.

In one embodiment, the switch may include a diode. The power supply may include a plurality of power supply modules each including a plurality of DC/DC converters and a controller. Each DC/DC converter may be configured as a buck converter with a switch triggered by the controller to modulate the DC/DC converter. Each DC/DC converter may include an inverter, a transformer, and a rectifier in which the inverter is cycled by the controller to modulate the DC/DC converter. The controller may be configured to modulate each DC/DC converter using modulation. The controller may be configured to stagger the timing of the switch of each DC/DC converter to reduce ripple on the low voltage DC bus. The controller may be responsive to a fault signal input and programmed to open the switch of each DC/DC converter in response to a fault signal. The controller may be configured to stagger the timing of the inverter of each DC/DC converter to reduce ripple on the low voltage DC bus. The controller may be responsive to a fault signal input and programmed to open the inverter of each DC/DC converter in response to a fault signal. Each power supply module may include a fuse between the plurality of DC/DC converters and the low voltage DC bus designed to fail at a current level greater than the rated current output of the power supply module. The controller may be configured to determine a desired output voltage based on the current output by the power supply module. The controller may include a switching voltage regulator configured to compare a desired system output voltage with the voltage level output by the power supply module and to adjust the voltage output of each DC/DC converter such that the output of the power supply module approximately equals the desired system output voltage. The switching voltage regulator may adjust the voltage output by each of the DC/DC converters utilizing modulation. The controller of each of the plurality of power supply modules may utilize pseudo-impedance to provide autonomous load sharing of the plurality of power supply modules. The low voltage output on the low voltage DC bus may be in the range of about 6V DC to 100V DC. The low voltage output on the low voltage DC bus voltage may be about 48V DC. The controller may be further configured to output an error signal in response to a fault signal. The controller may further include a fault determination circuit for generating the fault signal. Each of the plurality of power supply modules may include a cooling system. The fault detection circuit may generate a fault signal when a power supply module exceeds a predetermined temperature. The buck converter may include an input capacitor, an output capacitor, an inductor, and the switch. The ratio of the high voltage on the high voltage DC bus to the low voltage on the low voltage DC bus may be in the range 1.1:1 to about 1000:1. The ratio of the high voltage on the high voltage DC bus to the low voltage on the low voltage DC bus may be about 10:1. The ratio of the high voltage on the high voltage DC bus to the low voltage on the low voltage DC bus may be about 2:1. The power supply may be housed in a cabinet. Each of the plurality of power supply modules may be configured as a removable drawer. The removable drawers may be disposed in the cabinet. Each removable drawer may include a plurality of different length connectors that electrically connect the number of DC/DC converters of the power supply module to the high voltage DC bus at different times to reduce electrical discharge. Each of the connectors may include a resistive material therein for reducing electrical discharge when connecting the power supply module to the high voltage DC bus. Each removable drawer may include an auxiliary contact connected by a separate auxiliary resistor or spark-suppressing impedance network for further reducing electrical discharge. The removable drawers may be able to be removed, replaced, or added while the system is running. Each drawer may include a number of cooling fans and exhaust ports for cooling the power supply modules. The components of each of the plurality of power supply modules may be arranged to maximize cooling efficiency. The computing loads may be chosen from the group consisting of: a telecommunications system, a data communication system, a computer system, and computer peripherals. The power supply may include a redundant number of power supply modules.

BRIEF DESCRIPTION OF THE DRAWINGS

Other objects, features and advantages will occur to those skilled in the art from the following description of a preferred embodiment and the accompanying drawings, in which.

PREFERRED EMBODIMENT

Figure 1:
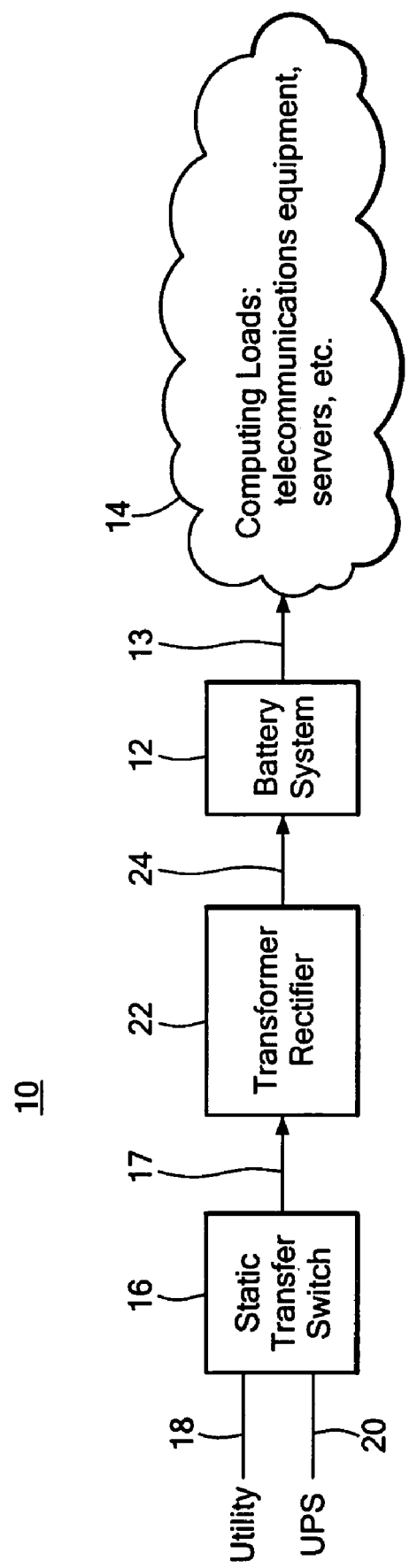
FIG. 1 is a schematic block diagram of a typical conventional battery system for delivering low voltage DC to computing loads.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

As discussed in the Background section above, conventional power source system 10, FIG. 1, utilizes large battery system 12 to provide low voltage DC, e.g., 48V DC, to computing loads 14, such as data communications equipment, computer systems, and the like. System 10 typically includes static transfer switch 16 responsive to a high voltage AC source on line 18 delivered by a conventional utility line or a high voltage AC source delivered by a UPS or similar device on line 20 in the event of a power failure. Static transfer switch 16 delivers either the high voltage AC source from the utility line or the UPS by line 17 to transformer/rectifier device 22. Transformer/rectifier device 22 provides the necessary charging current to continually charge the batteries in battery system 12. However, as discussed above, battery system 12 and its associated high current, low voltage DC bus 13 are typically massive in size. Moreover, system 10 provides no redundancy for any of the components for static transfer switch 16 or transformer/rectifier device 22.

Figure 2:
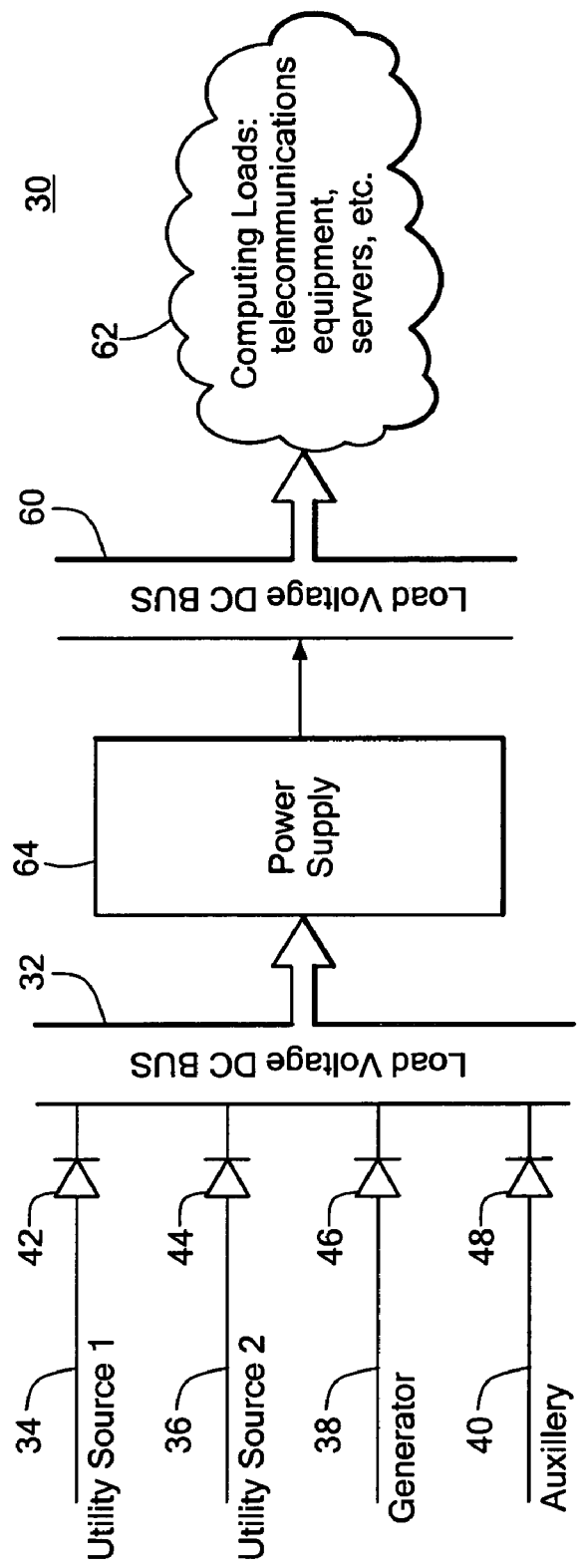
FIG. 2 is a schematic block diagram of one embodiment of the more compact and higher reliability power source system of this invention.

In contrast, a more compact and higher reliability power source system 30, FIG. 2 in accordance with this invention, includes high voltage DC bus 32 connected to a number of high voltage DC sources, such as DC source 34 (e.g., utility source 1), DC source 36 (e.g., utility source 2), DC source 38 (e.g., a generator), and DC source 40 (e.g., an auxiliary source). High voltage DC sources 34-40 are typically at about 550V DC. DC sources 34-40 are each connected to high voltage DC bus 32 with a switch, e.g., a diode, that is configured to deliver to high voltage bus 32 power from the DC source with the highest DC voltage. In this example, switches 42, 44, 46 and 48 connect DC sources 34, 36, 38 and 40, respectively, to high voltage DC bus 32. In operation, when the voltage on any of DC sources 34-40 is greater than the voltage on high voltage DC bus 32, the switch (diode) associated with the DC source with the highest voltage is forward biased and the high voltage DC voltage will be supplied from that source. The switches for the remaining DC sources will be back-biased by the small negative differential voltages deliberately or accidentally introduced between the voltages from those sources and voltage of the highest-voltage source, and hence no power will be delivered by those sources. If, however, the active source fails or its voltage drops below any of the other power sources, power will instantaneously and automatically be drawn from the new highest voltage source. High voltage DC bus 32 is typically distributed throughout a typical installation of system 30 and provides for connecting power supply 64 close to the point of intended use (discussed below).

System 30 also includes low voltage DC bus 60 connected to computing loads 62, e.g., telecommunications equipment, data communications equipment, computer equipment, servers, and the like, or any electronic device or system that utilizes low voltage DC. Typically, the voltage on low voltage DC bus 60 is in the range of about 6V DC to 100V DC, e.g., about 48V DC.

Power supply 64 includes a number of DC/DC converters (discussed below) connected in parallel between high voltage DC bus 32 and low voltage DC bus 60 and a controller (also discussed below) configured to modulate each DC/DC converter to convert the high voltage on high voltage DC bus 32 to a low voltage output on low voltage DC bus 60.

Figure 3:
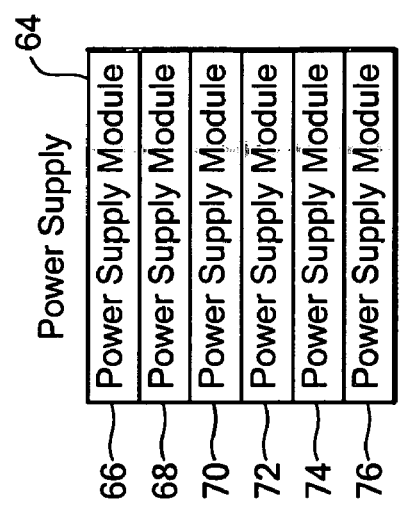
FIG. 3 is a schematic block diagram showing the components of one embodiment of the power supply shown in FIG. 2.

In a preferred embodiment, power supply 64, FIG. 3, includes a plurality of power supply modules, e.g., power supply modules 66, 68, 70, 72, 74, and 76 that each include a plurality of DC/DC converters and a controller. For example, each power supply module 66-76 includes DC/DC converters 150, 152, 154, 156, 158 and 160, FIG. 4, that are connected in parallel between high voltage DC bus 32 and low voltage DC bus 60. Connector 81 connects the high voltage DC on line 101 from high voltage bus 32 to each of DC/DC converters 150-160 by lines 103, 105, 107, 109, 111, and 113, respectively. Controller 80 modulates each of DC/DC converters 150-160 by lines 220, 222, 224, 226, 228 and 230 to convert the high voltage DC on lines 103-113 to low voltage DC on lines 96, 98, 100, 102, 104 and 106. Connector 117 connects the output of DC/DC converters 150-160 on lines 96-106 to line 90.

The result is that low voltage DC is supplied to low voltage DC bus 60, FIG. 2, without the need for a massive and cumbersome battery system. Each of power supply modules 66-76, FIG. 3 are relatively small in size, e.g., 19" by 5" by 24", for a typical 30 kW power supply module, which results in power supply 64 being compact. Because power supply 64 is compact and utilizes high voltage DC from high voltage DC bus 32 that can be distributed throughout an installation of system 30, power supply 64 can be located close to the point of intended use. Hence, the need for a large and expensive low-voltage, high-current bus-distribution system is eliminated. This allows a higher ratio of the DC voltage on the high voltage DC bus 32 to final application voltage on low voltage DC bus 60 that is the range of about 1.1:1 to 1000:1, e.g., 10:1 or 2:1. A higher bus voltage translates through Ohm's law to a proportionally lower current for the same power. Using a higher voltage input power bus distribution system (high voltage DC bus 32) therefore reduces $I^2R$ losses in the high voltage bus 32, which further reduces energy usage and costs. System 30 can also utilize a number of independent high voltage DC sources discussed above and automatically uses the DC source with the highest DC voltage, which improves the reliability. System 30 also has redundancy capabilities (discussed below) which provide increased uninterruptability and reliability. System 30 can also be relocated as needed, and can be connected in parallel with any number of power source systems 30 as needed to meet any changing load physical configurations or electrical requirements.

Figure 4:
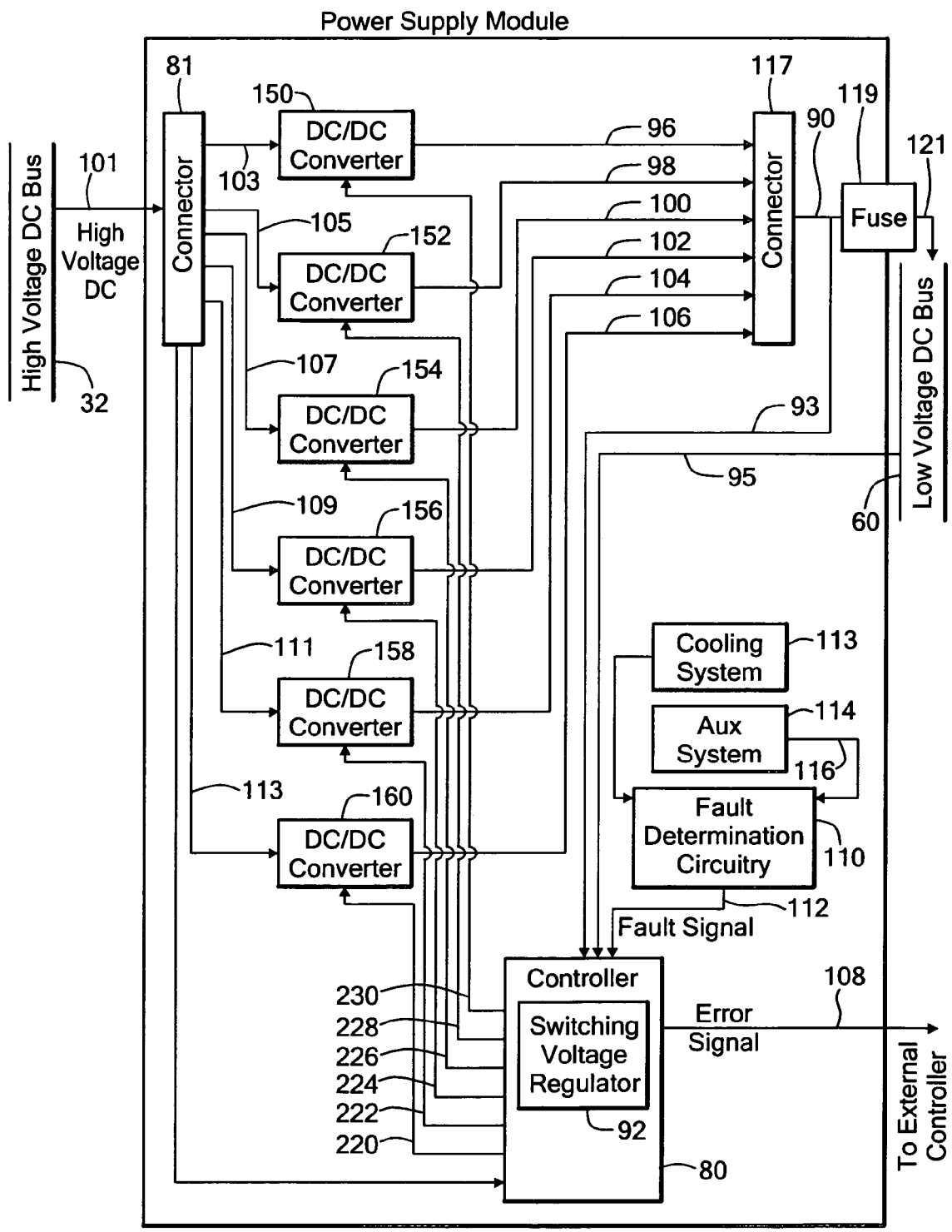
FIG. 4 is a schematic block diagram showing in detail the primary components of a power supply module shown in FIG. 3.

In one design, fuse 119, FIG. 4, is connected between the output voltage of the power supply module on line 90 and the low voltage DC bus by line 121. Fuse 119 is designed to fail when the current level output by the power supply module is greater than the rated current output of the power supply module, e.g., 600 amps.

Figure 5:
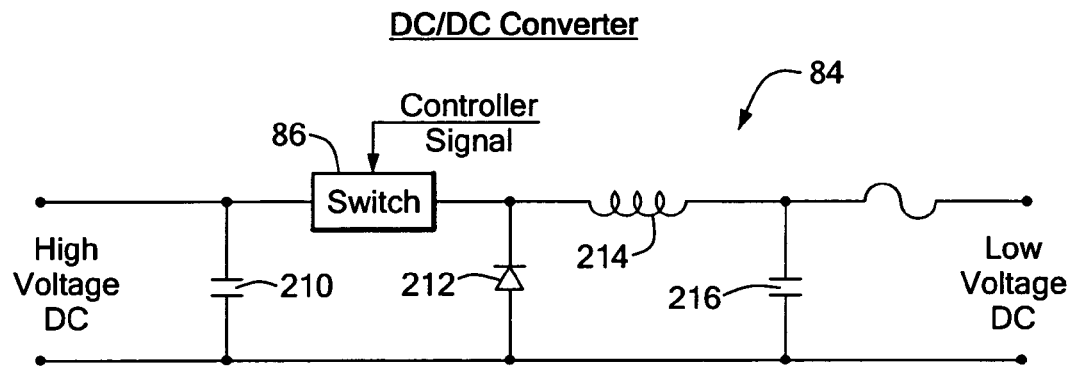
FIG. 5 is an electrical circuit diagram of a buck converter that may be employed in each of the DC/DC converters shown in FIG. 4.

Each of the DC converters 150-160, FIG. 4 is typically configured as a buck converter, as shown by buck converter 84, FIG. 5. Buck converter 84 includes input capacitor 210, diode 212, inductor 214 and output capacitor 216 and switch 86, e.g., an insulated gate bipolar transistor (IGBT). Switch 86 is triggered by controller 80, FIG. 4, to modulate the voltage output of the buck converter of each of DC/DC sources 150-160 and convert the high voltage DC on lines 103-113 to low voltage DC on lines 98-106. For example, controller 80 may utilize fixed clock modulation, e.g., pulse width modulation, to generate pulse width signals on lines 220-230 that time how long each switch of each buck converter of DC/DC converters 150-160 will remain open and closed in order to adjust the ratio of the "on" time and "off" time of the switch of the buck converter to control the output voltage and effectively convert the high voltage DC on lines 103-113 to low voltage DC on lines 96-106 and control the output voltage of the power supply module on line 90. Controller 80 may utilize fixed clock modulation, e.g., pulse width modulation, self-oscillation modulation, e.g., pulse frequency modulation or hysteretic modulation, or any type of modulation known to those skilled in the art, to control the timing of the switches in DC/DC 150-160 to convert the high voltage DC to low voltage DC.

Figure 6:
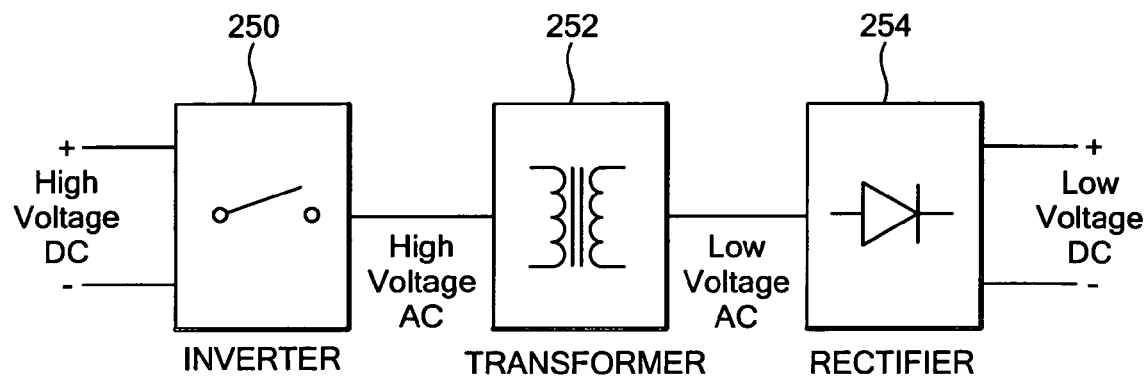
FIG. 6 is an electrical circuit diagram of an inverter, transformer and rectifier that may be employed in each of the DC/DC converters shown in FIG. 4.

In one design, each of DC/DC converters 150-160 is configured as shown in FIG. 6. In this example, each of DC/DC converters 150-160, FIG. 4 includes inverter 250, FIG. 6, transformer 252 and rectifier 254. Similar to the switch in the buck converter described above, inverter 250 is triggered by controller 80, FIG. 4 to modulate each of DC/DC converters 150-160 and convert the high voltage DC on lines 103-113, FIG. 4 to the low voltage DC on lines 98-106.

In a preferred embodiment, controller 80 initiates the signals on lines 220-230 that are equally time staggered, e.g., staggered 60° apart in phase for the six parallel DC-DC sources 150-160, or 360°/N for N parallel units, to stagger the timing of the switch or inverter in each of DC/DC sources 150-160 described above to reduce the ripple of the low voltage DC on line 90.

Controller 80 can also determine a desired output voltage to be output by the power supply module on line 90 based on the current output by the power supply module by feedback line 93. Controller 80 includes switching voltage regulator 92 that compares the desired system output voltage on low voltage DC bus 60 by feedback line 95 with the actual voltage output by the power supply module on line 90. Switching voltage regulator 92 then adjusts the voltage output of the power supply module to the desired system voltage output by changing the modulation of DC/DC converters 150-160 using fixed clock modulation (e.g., pulse width modulation), self-oscillating modulation, e.g., pulse frequency modulation or hysteretic modulation, or any modulation technique known to those skilled in the art.

In one embodiment, controller 80 is also responsive to a fault signal on feedback line 93 and is programmed to open the switch (e.g., switch 86, FIG. 5), or inverter (e.g., inverter 250, FIG. 6) of each of the DC/DC converters 150-160, FIG. 4, when the fault signal on line 93 indicates the power supply module is generating excessive voltage or current (discussed in detail below). This will remove the malfunctioning power supply module from the parallel configuration of power supply modules 66-76, FIG. 3 of power supply 64 and hence prevent the damaged power supply module from effecting the operation of power supply 64. Controller 80, may also generate an error signal on line 108 that enables an external controller, such as a PLC, in response to the fault signal on line 112 from the various subsystems within the power supply module. For example, fault determination circuitry 110 may be responsive to cooling system 113 that detects an overheating condition in the power supply module and thus activates fault determination circuitry 110 to generate a fault signal on line 112 that enables controller 80 to generate an error signal on line 108 to enable the external controller. Additional auxiliary system 114 can also generate an error signal on line 116 that enables fault determination circuitry 110 to generate a fault signal on line 112 and enable controller 80 to generate an error signal to enable the external controller.

Figure 7:
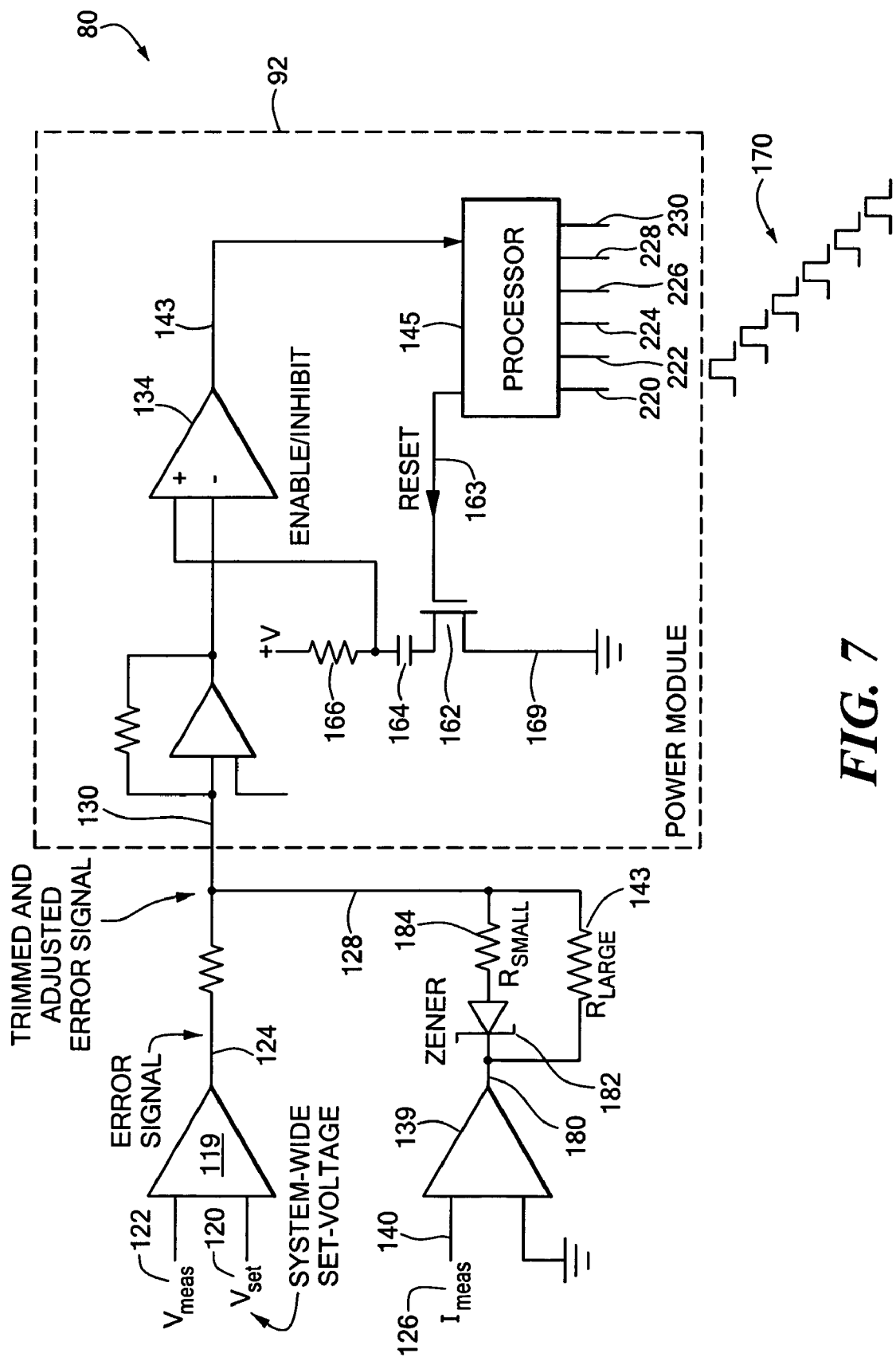
FIG. 7 is an electrical circuit diagram showing one embodiment of the controller shown in FIG. 4.
Figure 8:
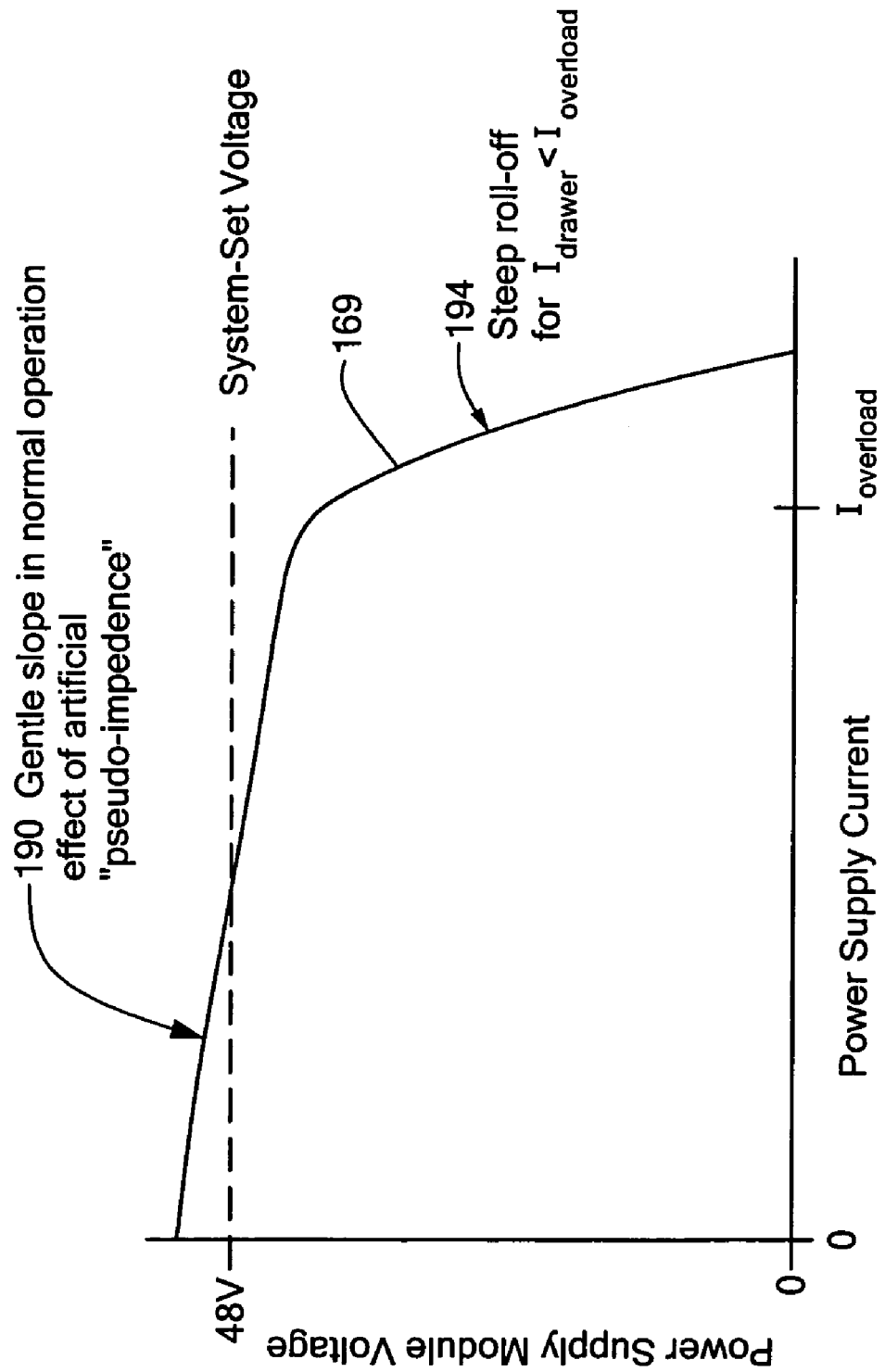
FIG. 8 is a graph showing the output V-I characteristic of the control circuit shown in FIG. 7.

FIG. 7, where like parts have been given like numbers, shows one embodiment of controller 80 of this invention that utilizes pulse width modulation to adjust the low voltage DC output of each of power supply modules 66-76, FIG. 3. In this example, comparator 119, FIG. 7 compares a reference system output voltage, $V_{set}$, indicated at 120, e.g., the voltage on the low voltage DC bus discussed above, to the measured output voltage of the power supply module, $V_{meas}$, indicated at 122, and generates an error signal on line 124. Controller 80 also includes comparator 139 that measures the output current of the power supply module, $I_{meas}$, indicated at 126. The measured current, $I_{meas}$ on line 140, can take one path through large resistor 143, e.g., about 150 kΩ, and is combined with the error signal on line 124 to provide a trimmed and adjusted error signal on line 130 that provides only a slight change in the voltage output of the power supply module. This adjustment causes the output voltage of the power supply module to shift over a narrow range of values and is used to vary the output voltage of the power supply module to create the effect of a small positive internal impedance. The trimmed and adjusted signal on line 130 establishes a synthetic V-I characteristic, as shown by curve 169, FIG. 8. The trimmed and adjusted signal provides the power supply module with an apparent, battery-like source-resistance or "pseudo-impedance" corresponding to a small, but positive value of internal resistance, indicated by arrow 190 that enables the power supply module, e.g., power supply module 66, FIG. 3, to share loads equally with the other power supply modules, e.g., power supply modules 68-76 of power supply 64.

The measured current, $I_{meas}$, indicated at 126, FIG. 7, also takes another path on line 180 that includes zener diode 182 and small resistor 184, e.g., about 301 Ω. During operation, zener diode 182 remains off. However, if higher than allowable current begins to be drawn by the power supply module, the current, $I_{meas}$, increases and zener diode 182 will be enabled. At this point, small resistor 184 strongly drags the signal voltage down. This results in a large and rapid change in the trimmed and adjusted error signal on line 130 and a radical reduction in the commanded local output voltage set point. The result is a sudden and steep drop-off of the V-I curve 169, FIG. 8, as indicated by arrow 194. This feature guarantees that if the current of an individual power supply module starts to become too high, the output voltage of power supply module will drop rapidly and shut that power supply module down.

Switching voltage regulator 92, FIG. 7 is responsive to the trimmed and adjusted error signal on line 130 and adjusts the output voltage generated by each of the DC/DC converters 150-160, FIG. 4, using modulation, e.g., fixed clock modulation, such as pulse width modulation (although any type of modulation as discussed above may be utilized). Switching voltage regulator 92 typically includes voltage controlled delay generator 134, processor 145, switch 162, e.g., a FET, capacitor 164, pull-up resistor 166 and voltage source 168. In operation, voltage controlled delay generator 134 is held in an inhibited state by the voltage on capacitor 164. Discharging of capacitor 164 enables voltage controlled delay generator 134 to process the trimmed and adjusted error signal on line 130 to enable processor 145 by line 143. Discharging of capacitor 164 is achieved by a reset signal on line 163 that enables FET 162 to discharge capacitor 164 by ground 169. Charging of capacitor is achieved by voltage source 168, as known by those skilled in the art. The trimmed and adjusted error signal on line 143 enables processor 145 to generate pulse width signals on lines 220-230, indicated by arrow 170, to control the timing of the switches of DC/DC converters 150-160, FIG. 4, as discussed above. Based on the size of error signal on line 130, processor 145 determines the pulse width that is needed by the signals on lines 220-230 to control the timing of the switch of each of DC/DC converters 150-160, FIG. 4, to adjust the output voltage of the power supply module to the desired system output voltage. Processor 145, FIG. 7, also determines the sequencing of the pulse signals on lines 220-230 to stagger the triggering of the switches or inverters of DC/DC converters 150-160 to reduce ripple. For example, processor 145, can initiate a sequence of pulses, shown by arrow 170, that stagger the triggering of the switches or inverters of the six DC/DC converters 150-160, FIG. 4, to reduce ripple. Typically, the staggered pulse signals on lines 220-230 are in a time staggered sequence 60° apart in phase for the six DC sources 150-160, as described above.

The "pseudo" impedance described above in relation to controller 80, FIGS. 4, 7, and 8 provides desirable load sharing of power supply modules 66-76, FIG. 3. In this embodiment, if an individual power supply module of power supply modules 66-76, of power supply 64 is lightly loaded compared to the other power supply modules, that power supply module will operate at a slightly higher output voltage (due to its positive "pseudo-impedance"). Conversely, the output voltage for an individual power supply module of power supply modules 66-76 will be slightly lower when a heavier current is being drawn from it. The higher voltages of lightly loaded power supply modules will result in more current being drawn from them, which will have the effect of reducing their output voltage. The more highly loaded power supply modules will draw less currents, increasing their output voltage. In this way, all of the modules will reach an equilibrium in the middle of the voltage range, in which power is drawn equally from each module, without any explicit control signals required to be passed between the modules. This process of continuous mutual load adjustment and load sharing guarantees overall system stability, and prevents any one supply (or collection of supplies) from "hogging" the load.

Figure 9:
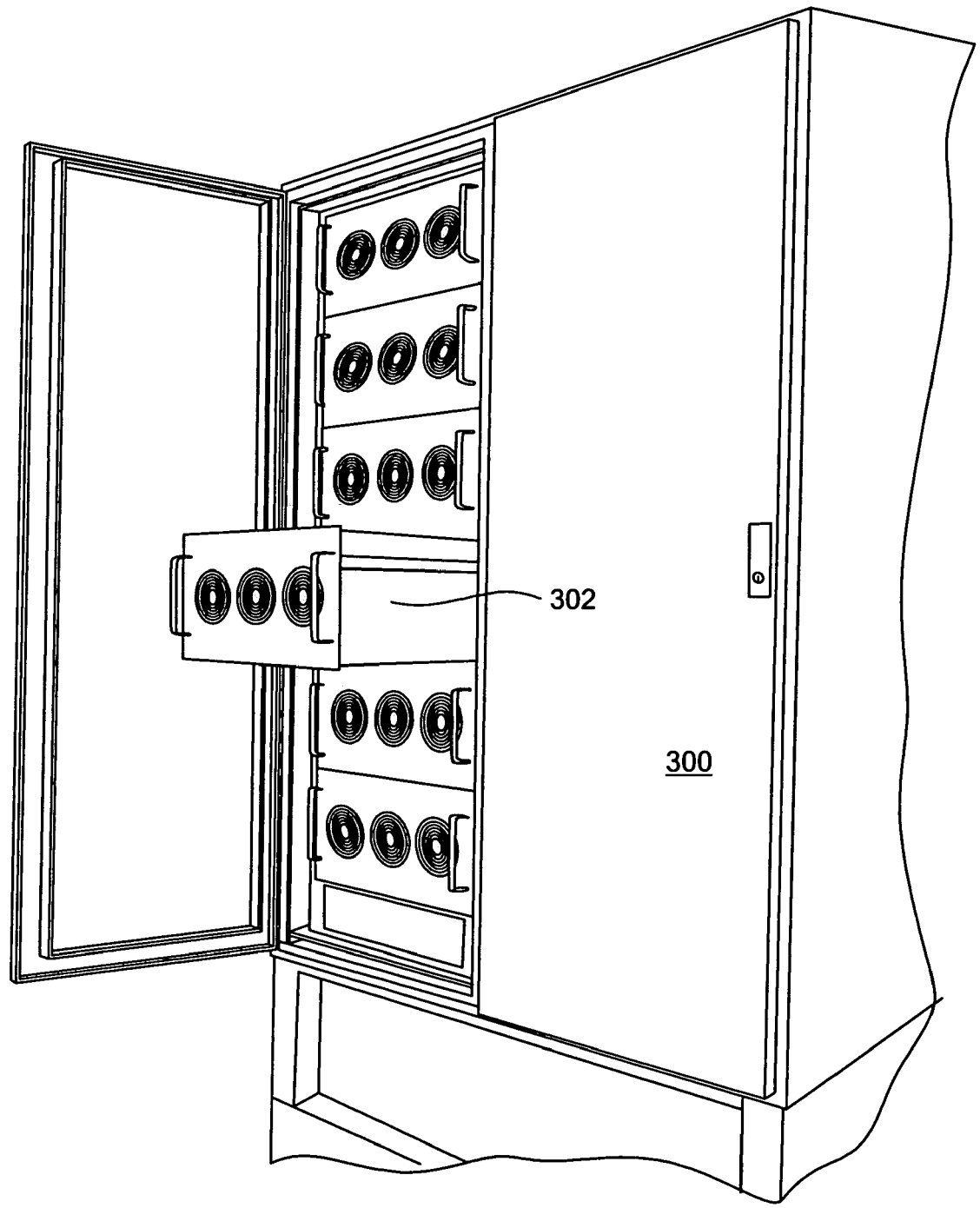
FIG. 9 is a three-dimensional schematic view showing one example of the power supply shown in FIG. 3 configured in a cabinet and the power supply modules shown in FIG. 4 configured as removable drawers in the cabinet.
Figure 10:
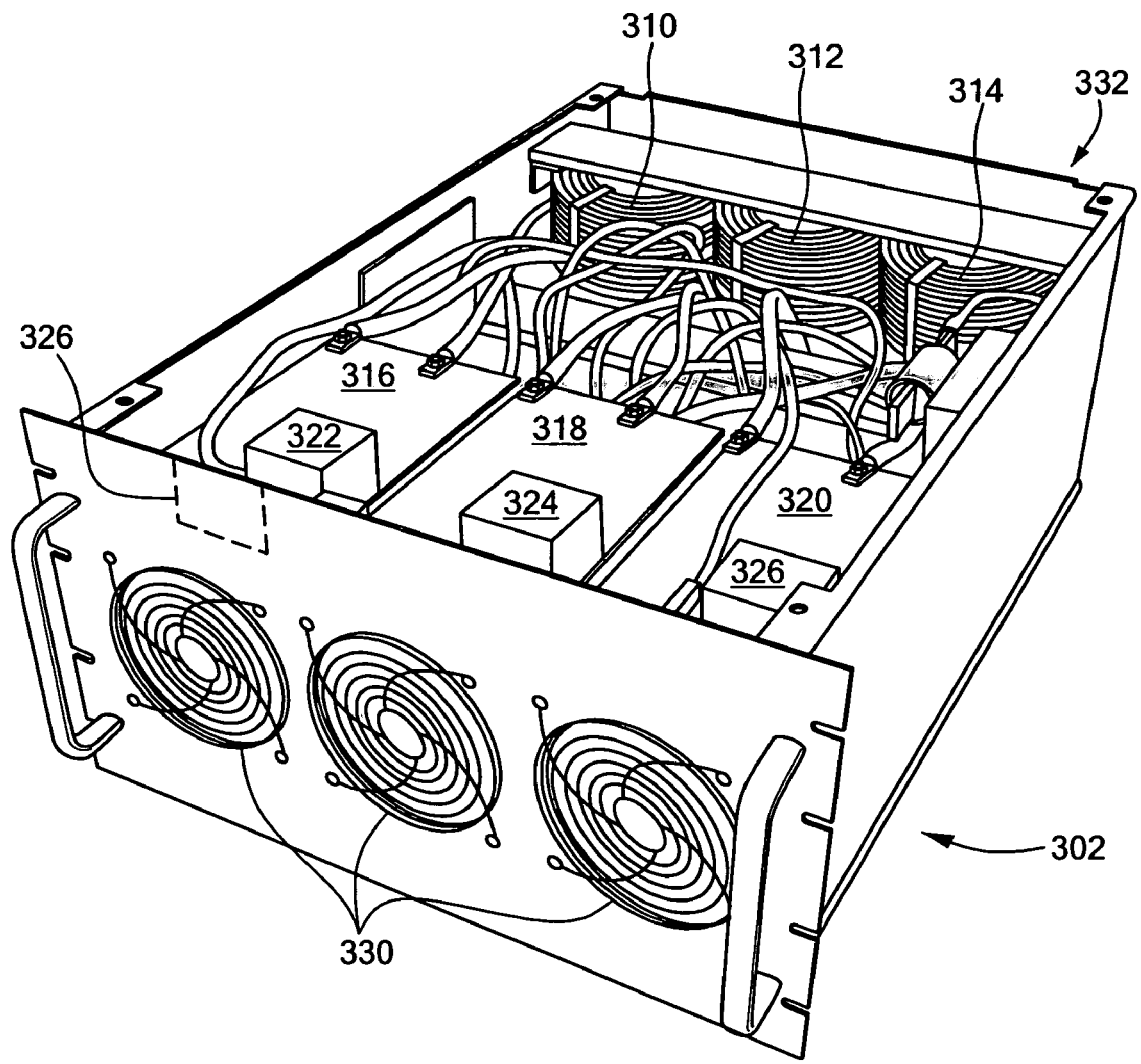
FIG. 10 is a three-dimensional schematic view showing further details associated with the primary components of a removable drawer shown in FIG. 9.

In a preferred embodiment, power supply 64, FIGS. 2 and 3, is ideally enclosed in a cabinet, such as cabinet 300, FIG. 9. Power supply modules 66-76, FIG. 3, are typically each enclosed in a removable drawer, such as drawer 302, FIG. 9. Removable drawer 302 houses the various components of the individual power supply modules 66-76 discussed above in reference to FIG. 4. For example, drawer 302, FIG. 10, includes six DC/DC converters, of which three are shown and three are stacked below (not shown). The inductors of the buck converters of the shown DC/DC converters are indicated at 310, 312, and 314. The IGBT switch for each of the three buck converters is indicated at 316, 318 and 320. The input capacitors are indicated at 322, 324, and 326. The controller (shown in phantom) is indicated at 326. Drawer 302 typically includes cooling fans 330 that provide cooling air to drawer 302 that exits through exhaust ports (not shown) located on back panel 332. The orientation of inductors 310-314, switches 316-320 and input capacitors 322-326 are arranged to maximize the cooling efficiency of drawer 302.

Figure 11:
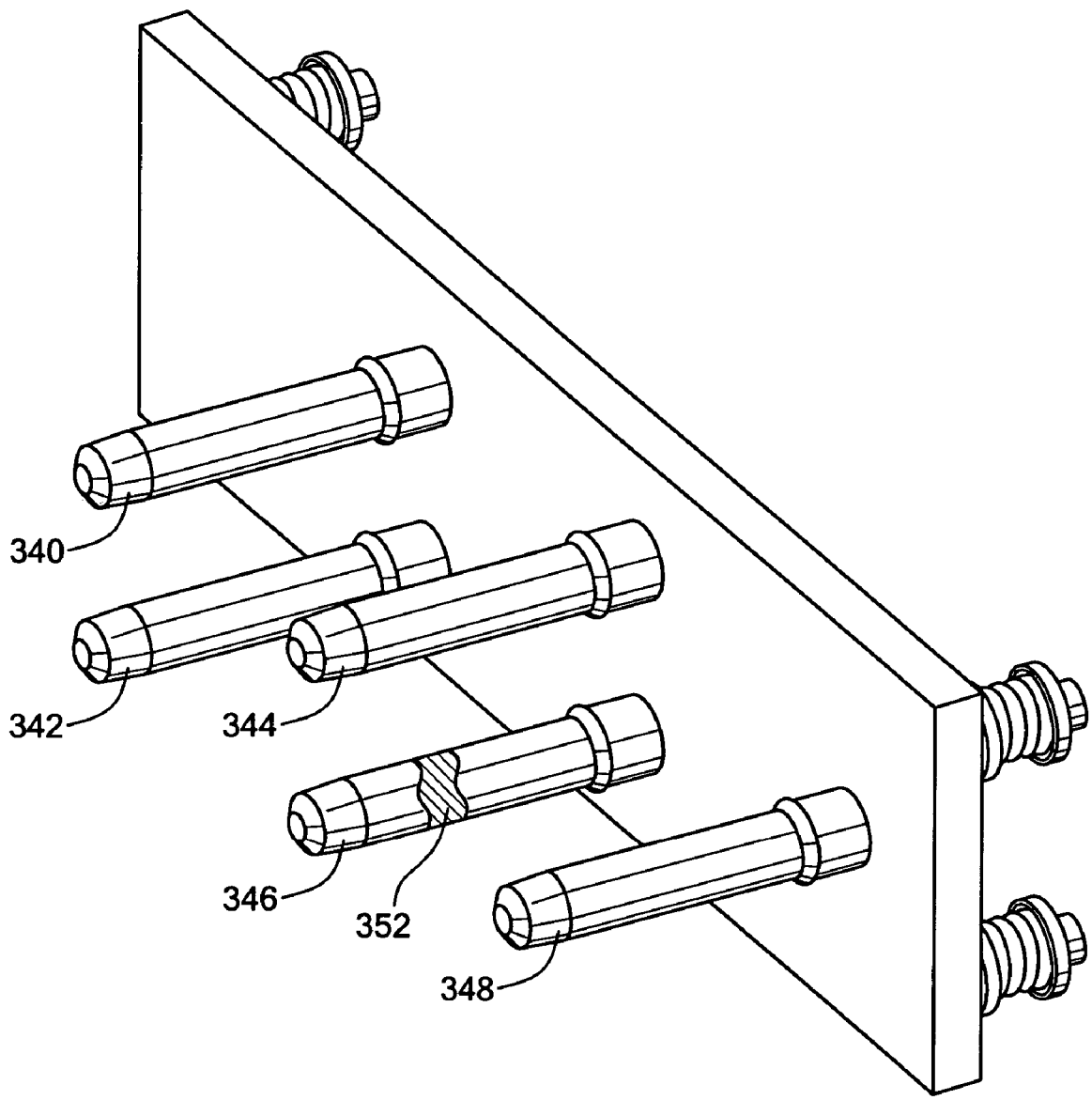
FIG. 11 is a schematic three-dimensional view showing one example of the connectors that may be used to connect the removable drawers shown in FIG. 9 to a high voltage DC bus.

Drawer 302 typically includes a plurality of different length connectors, e.g., connectors 340, 342, 344, and 346, FIG. 11, that allow the DC/DC converters to be connected to the high voltage DC bus without causing electrical discharge. In one example, each of the connectors 340-348 may include a section of resistive material, such as resistive material 352 in connector 346 to prevent discharge of high voltage DC when connecting drawer 302 to the high voltage DC bus. In some designs an auxiliary contact connected by a separate auxiliary resistor or spark-suppressing impedance network may be employed to further prevent discharge of high voltage DC when connecting drawer 302 to the high voltage DC bus. Hence, the configuration of connectors 340-348 allows each of the various removable drawers that house the power supply modules to be added, removed, or replaced while a system 30 is in operation, i.e., the removable drawers are "hot swappable".

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A more compact and higher reliability power source system for computing loads, the system comprising:
   a high voltage DC bus connected to a number of high voltage DC sources each connected to the high voltage DC bus by a switch configured to deliver to the high voltage DC bus the DC source with the highest DC voltage;
   a low voltage DC bus connected to the computing loads; and
   a power supply including:
      a number of DC/DC converters connected in parallel between the high voltage DC bus and the low voltage DC bus, and
      a controller configured to modulate each DC/DC converter to convert the high voltage on the high voltage DC bus to a low voltage output on the low voltage DC bus by utilizing pseudo-impedance to provide load sharing with other power supply modules without direct communication with other power supply modules and without feedback from a point of common reference.

2. The power source system of claim 1 in which the switch includes a diode.

3. The power source system of claim 1 in which the power supply includes a plurality of power supply modules each including a plurality of DC/DC converters and a controller.

4. The power source system of claim 3 in which each DC/DC converter is configured as a buck converter with a switch triggered by the controller to modulate the DC/DC converter.

5. The power source system of claim 4 in which the controller is configured to stagger the timing of the switch of each DC/DC converter to reduce ripple on the low voltage DC bus.

6. The power source system of claim 4 in which the controller is responsive to a fault signal input and programmed to open the switch of each DC/DC converter in response to a fault signal.

7. The power source system of claim 4 in which the buck converter includes an input capacitor, an output capacitor, an inductor, and the switch.

8. The power source system of claim 3 in which each DC/DC converter includes an inverter, a transformer, and a rectifier in which the inverter is cycled by the controller to modulate the DC/DC converter.

9. The power source system of claim 8 in which the controller is configured to stagger the timing of the inverter of each DC/DC converter to reduce ripple on the low voltage DC bus.

10. The power source system of claim 8 in which the controller is responsive to a fault signal input and programmed to open the inverter of each DC/DC converter in response to a fault signal.

11. The power source system of claim 3 in which each power supply module includes a fuse between the plurality of DC/DC converters and the low voltage DC bus designed to fail at a current level greater than the rated current output of the power supply module.

12. The power source system of claim 3 in which the controller is configured to determine a desired output voltage based on the current output by the power supply module.

13. The power source system of claim 3 in which the controller includes a switching voltage regulator configured to compare a desired system output voltage with the voltage level output by the power supply module and to adjust the voltage output of each DC/DC converter such that the output of the power supply module approximately equals the desired system output voltage.

14. The power source system of claim 13 in which the switching voltage regulator adjusts the voltage output by each of the DC/DC converters utilizing modulation.

15. The power source system of claim 3 in which the power supply is housed in a cabinet.

16. The power source system of claim 15 in which each of the plurality of power supply modules are configured as a removable drawer.

17. The power source system of claim 16 in which the removable drawers are disposed in the cabinet.

18. The power source system of claim 17 in which each removable drawer includes a plurality of different length connectors that electrically connect the number of DC/DC converters of the power supply module to the high voltage DC bus at different times to reduce electrical discharge.

19. The power source system of claim 18 in which each of the connectors includes a resistive material therein for reducing electrical discharge when connecting the power supply module to the high voltage DC bus.

20. The power source system of claim 17 in which the removable drawers can be removed, replaced, or added while the system is running.

21. The power source system of claim 18 in which each removable drawer includes an auxiliary contact connected by a separate auxiliary resistor or spark-suppressing impedance network for further reducing electrical discharge.

22. The power source system of claim 16 in which the components of each of the plurality of power supply modules are arranged to maximize cooling efficiency.

23. The power source system of claim 16 in which each drawer includes a number of cooling fans and exhaust ports for cooling the power supply modules.

24. The power source system of claim 3 in which the power supply includes a redundant number of power supply modules.

25. The power source system of claim 1 in which the controller is configured to modulate each DC/DC converter to control output voltage or current.

26. The power source system of claim 1 in which the low voltage output on the low voltage DC bus is in the range of about 6V DC to 100V DC.

27. The power source system of claim 26 in which the low voltage output on the low voltage DC bus voltage is about 48V DC.

28. The power source system of claim 1 in which the controller is further configured to output an error signal in response to a fault signal.

29. The power source system of claim 28 in which the controller further includes a fault determination circuit for generating the fault signal.

30. The power source system of claim 29 in which each of the plurality of power supply modules includes a cooling system.

31. The power source system of claim 30 in which the fault detection circuit generates a fault signal when a power supply module exceeds a predetermined temperature.

32. The power source system of claim 1 in which the ratio of the high voltage on the high voltage DC bus to the low voltage on the low voltage DC bus is in the range 1.1:1 to about 1000:1.

33. The power source system of claim 32 in which the ratio of the high voltage on the high voltage DC bus to the low voltage on the low voltage DC bus is about 10:1.

34. The power source system of claim 33 in which the ratio of the high voltage on the high voltage DC bus to the low voltage on the low voltage DC bus is about 2:1.

35. The power source system of claim 1 in which the computing loads are chosen from the group consisting of: a telecommunications system, a data communication system, a computer system, and computer peripherals.

* * * * *